United States Patent [19]

Higa

[11] Patent Number: 5,153,755
[45] Date of Patent: Oct. 6, 1992

[54] FERROELECTRIC LIQUID CRYSTAL OPTICAL DEVICE HAVING DIELECTRIC LAYERS WITH LARGE SURFACE ENERGY AND HIGH POLAR POWER COMPONENT

[75] Inventor: Masakatsu Higa, Fussa, Japan
[73] Assignee: Casio Computer Co., Ltd., Tokyo, Japan
[21] Appl. No.: 621,356
[22] Filed: Dec. 3, 1990
[30] Foreign Application Priority Data
Dec. 7, 1989 [JP] Japan .................. 1-316364
[51] Int. Cl.⁵ ............................. G02F 1/133
[52] U.S. Cl. ........................ 359/75; 359/76; 359/79; 359/56; 359/100
[58] Field of Search ............ 350/339 R, 341, 350 S, 350/334, 340; 340/765, 384

[56] References Cited

U.S. PATENT DOCUMENTS

| | | | |
|---|---|---|---|
| 4,367,924 | 1/1983 | Clark et al. | 350/350 S |
| 4,563,059 | 1/1986 | Clark et al. | 350/350 S |
| 4,586,791 | 5/1986 | Isogai et al. | 350/341 |
| 4,738,515 | 4/1988 | Okada et al. | 350/339 R |
| 4,796,979 | 1/1989 | Tsuboyama | 350/341 |
| 4,813,767 | 3/1989 | Clark et al. | 350/350 S |
| 4,840,463 | 6/1989 | Clark et al. | 350/350 S |
| 4,902,106 | 2/1990 | Dijon et al. | 350/341 |
| 4,932,757 | 6/1990 | Hanyu et al. | 350/339 R |
| 4,939,003 | 7/1990 | Aoki et al. | 350/341 |
| 5,013,137 | 5/1991 | Tsuboyama | 359/56 |
| 5,029,987 | 7/1991 | Shinomiya | 359/75 |

FOREIGN PATENT DOCUMENTS

| | | | |
|---|---|---|---|
| 61-183624 | 8/1986 | Japan | 359/75 |
| 61-186930 | 8/1986 | Japan | 359/75 |
| 63-158526 | 7/1988 | Japan | 359/75 |
| 63-225224 | 9/1988 | Japan | 359/74 |
| 63-228125 | 9/1988 | Japan | 359/75 |
| 63-278030 | 11/1988 | Japan | 359/75 |

OTHER PUBLICATIONS

Kahn et al "Surface-Produced Alignment of Liquid Crystals" Proceedings of the IEEE-vol. 61-No. 7-Jul. 1973-pp. 823-828.

*Primary Examiner*—Stanley D. Miller
*Assistant Examiner*—Tai V. Duong
*Attorney, Agent, or Firm*—Frishauf, Holtz, Goodman & Woodward

[57] ABSTRACT

A liquid crystal optical device of this invention includes one substrate having a substrate surface on which one electrode is formed, the other substrate having a substrate surface on which the other electrode is formed, a first aligning film covering one electrode of one substrate and at least a portion of the substrate surface, a second aligning film covering the other electrode of the other substrate and at least a portion of the substrate surface, a dielectric layer disposed between at least one of the first and second aligning films and the electrode corresponding thereto, a sealing member for bonding the one substrate and the other substrate to each other with a predetermined gap therebetween to oppose the substrate surfaces of the one and the other substrates on which the electrodes are formed, and sealing the gap, and a ferroelectric liquid crystal material sealed in the gap surrounded by one and the other substrates disposed oppositely and the sealing member. The dielectric layer is formed of a metal oxide film having approx. 20 dyn/cm or more of polar power component of its surface energy.

10 Claims, 3 Drawing Sheets

FERROELECTRIC LIQUID CRYSTAL OPTICAL DEVICE HAVING DIELECTRIC LAYERS WITH LARGE SURFACE ENERGY AND HIGH POLAR POWER COMPONENT

BACKGROUND OF THE INVENTION

1. Field of the Invention

The present invention relates to a liquid crystal optical device using a ferroelectric liquid crystal.

2. Description of the Related Art

A liquid crystal optical device (hereinafter referred to as "FLC.LCD") using a ferroelectric liquid crystal was proposed by N. A. Clark and S. T. Lagerwall, etc., and is disclosed in U.S. Pat. Nos. 4,367,924, 4,563,059, 4,813,767, and 4,840,463. In this FLC.LCD, a pair of transparent substrates are disposed to oppose to each other, and aligning films are respectively formed on the opposed surfaces thereof. A liquid crystal material (hereinafter referred to as "a ferroelectric liquid crystal") exhibiting Chiral Smectic C* phase is sealed between the pair of transparent substrates. The aligning films function to align the liquid crystal molecules of the ferroelectric liquid crystal in one direction. By setting the gap between a pair of transparent substrates to the extent of the spiral pitch (e.g., approx. 2.5 $\mu$m or less) of a liquid crystal material exhibiting Chiral Smectic C* phase the spiral is released, thereby obtaining an uniaxial alignment having a layer surface perpendicular to the opposed surfaces of the substrates. Thus, in the FLC.LCD in which the uniaxial alignment is obtained, the alignment of the liquid crystal molecules is stable in two states, thereby obtaining tow optically stable states. That is, the FLC.LCD has a memory characteristic.

This memory characteristic depends upon the mutual action between the liquid crystal molecules and the surfaces of the aligning films. For example, if the surface energies of the aligning films are large with the result that the mutual action with the liquid crystal molecules is large, alignment restrictive force for arranging the liquid crystal molecules in a predetermined one direction is increased to easily obtain the uniaxial alignment. Since the aligning state is stable, memory characteristic is high.

However, since the alignment stability becomes high when the alignment restrictive force of the aligning film is large it becomes difficult to vary the aligning state. Therefore, it becomes difficult to alter one stable alignment state to the other stable aligning state by applying an electric field, and the responding characteristic of the liquid crystal by the application of the electric field is deteriorated.

The conventional FLC.LCD employed an obliquely deposited layer of silicon oxide (SiO) as an aligning film, and did not practically reduce the operating characteristic of the liquid crystal but could not obtain a completely uniform alignment. Accordingly, the FLC.LCD could not obtain sufficiently high stability of the alignment. Thus, the conventional FLC.LCD could not obtain practically sufficient bistability, sufficient memory characteristic.

In the conventional FLC.LCD, the thickness of the liquid crystal layer is extremely thin such as approx 2.5 $\mu$m or less, and only an alignment dielectric layer is interposed between transparent electrodes formed on the opposed surfaces of a pair of substrates and the liquid crystal layer. Accordingly, when fine electroconductive foreign material is mixed in the liquid crystal layer, a short-circuit occurs between the electrodes of a pair of the substrates.

It is an object of the present invention to provide a liquid crystal optical device using a ferroelectric liquid crystal, which does not practically lower operating characteristics of a liquid crystal by an electric field but can provide sufficient memory characteristic in practice and positively prevent a short-circuit between a pair of electrodes of a substrate even if a conductive foreign material is mixed in a liquid crystal layer.

SUMMARY OF THE INVENTION

In order to achieve the above-described object, there is provided a liquid crystal optical device comprising one substrate having a substrate surface on which one electrode is formed; the other substrate having a substrate surface o which the other electrode is formed; a first aligning film covering one electrode of one substrate and at least a portion of the substrate surface; a second aligning film covering the other electrode of the other substrate and at least a portion of the substrate surface; dielectric layer disposed between at least one of the first and second aligning films and the electrode corresponding thereto and having approx. 20 dyn/cm or more of polar power component of its sur-face energy; a sealing member for bonding the one substrate and the other substrate to each other with a predetermined gap therebetween to oppose the substrate surfaces of the one and the other substrates on which the electrodes are formed, and sealing the gap; and a ferroelectric liquid crystal material sealed in the gap surrounded by one and the other substrates disposed oppositely and the sealing member.

In the liquid crystal optical device of the present invention constructed as described above, the dielectric layer having high polar power component of the surface energy such as 20 dyn/cm or more is disposed between the aligning film of at least one substrate and the electrode. Accordingly, the influence powers of the polar power component of the dielectric layer having relatively large surface energy is acted, in addition to the alignment restrictive force of the aligning film having relatively small surface energy, to the liquid crystal molecules of the ferro-electric liquid crystal material sealed in the above-described gap. Consequently, the liquid crystal layer between the pair of substrates is uniform and stable in the aligning state. Since the dielectric layer having relatively large surface energy is disposed between the aligning film and the electrode, only the aligning film having small surface energy is brought into direct contact with the liquid crystal molecules of the liquid crystal layer. The alignment restrictive force acting directly to the liquid crystal molecules from the aligning film is weak, but the alignment restrictive force in combination with the alignment restrictive force of the dielectric layer disposed under the aligning film provides the bistability of practically suitably aligning state and memory characteristic, and responding characteristic by the application of an electric field at the liquid crystal molecules.

Therefore, according to the liquid crystal optical device of the present invention, sufficient memory characteristic can be obtained without reducing the operation characteristic of the liquid crystal molecules in response to the applied electric field.

Since the two layers of the dielectric layer and the aligning film are interposed between the electrode of at least one substrate and the liquid crystal layer in the liquid crystal optical element of the present invention, even if a conductive foreign material is mixed in the liquid crystal layer, it can reliably prevent a short-circuit between the electrodes of the pair of substrates.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

Various embodiments and modified embodiments of the present invention will be described in detail with reference to the accompanying drawings.

DETAILED DESCRIPTION OF THE PREFERRED EMBODIMENTS

Figure 1:
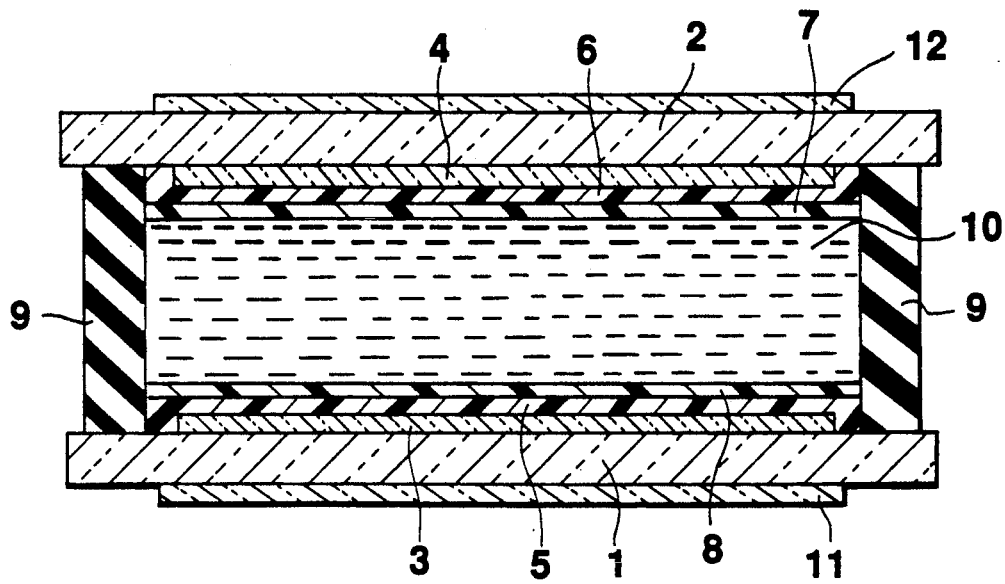
FIG. 1 is a sectional view showing an embodiment of the present invention.

FIG. 1 shows a section of a liquid crystal device of one embodiment of the present invention. In FIG. 1, a pair of transparent substrates (e.g., glass substrates) 1 and 2 are disposed oppositely to each other. Transparent electrodes 3 and 4 made of ITO (Indium - Tin Oxide), etc., are respectively formed on the opposed surfaces of the both substrates 1 and 2. Dielectric layers 5 and 6 having approx. 20 dyn/cm or more of polar power components of surface energy are respectively formed on the entire opposed surfaces of both the substrates 1 and 2 to cover the transparent electrodes 3 and 4. Aligning films 7 and 8 for uniaxially aligning liquid crystal molecules are respectively formed on the entire dielectric layers 5 and 6.

The dielectric layers 5 and 6 are formed of a dielectric material made of one or a plurality of components of metal oxide such as zirconium oxide series, titanium oxide ($TiO_2$) series, or a dielectric material made of an $SiO_2$ (silicon oxide) or a mixture of an $SiO_2$ and other metal oxide. The thickness of each of the, dielectric layers 5 and 6 is approx. 500 Å.

Aligning films 7 and 8 are formed of an obliquely deposited layer of an inorganic substance such as, for example, silicon oxide (SiO), and the thickness of each of the aligning films 7 and 8 is approx. 500 to approx. 2000 Å (preferably approx. 1000 Å). The depositing angle of each of the aligning films 7 and 8 is approx. 85° with respect to a normal line of the substrates 1 and 2, and the depositing directions of both the aligning films 7 and 8 are parallel to each other.

A pair of the substrates 1 and 2 are bonded to each other with a frame-shaped sealing material 9 in a state that the electrode forming surfaces thereof are opposed to each other. A pair of polarizing plates 11 and 12 are respectively disposed on the outer surface of the pair of substrates 1 and 2. A ferroelectric liquid crystal ($S_MC^*$) 10 of, for example, Chiral Smectic C* phase is sealed between the both substrates 1 and 2, and the liquid crystal molecules of the ferroelectric liquid crystal 10 are uniaxially aligned by the alignment restrictive forces of both the aligning films 7 and 8. The thickness of the liquid crystal 10 (a distance between the aligning films 7 and 8 of the opposed surfaces of both the substrates 1 and 2) is approx. 2.2 to approx. 2.5 μm.

Since the dielectric layers 5 and 6 having relatively high polar power components of surface energy such as approx. 20 dyn/cm or more are formed under the two aligning films 7 and 8 of the substrates 1 and 2 in this liquid crystal optical device, the dielectric layers 5 and 6 supplement the alignment restrictive forces of the aligning films 7 and 8.

Since the influence powers of the polar power components of the dielectric layers 5 and 6 having relatively large surface energies are acted, in addition to the alignment restrictive forces of the aligning films 7 and 8 having relatively small surface energies, to the liquid crystal molecules of the ferroelectric liquid crystal 10, the aligning state of the liquid crystal molecules of the liquid crystal layer 10 becomes uniform and stable. Since the dielectric layers 5 and 6 having large surface energies are disposed under the aligning films 7 and 8, the liquid crystal molecules of the liquid crystal layer 10 are only brought into direct contact with the aligning films 7 and 8 having relatively small surface energies. The alignment restrictive force acting directly to the liquid crystal molecules in the liquid crystal layer 10 from the aligning films 7 and 8 is weak, but the alignment restrictive force in combination with the alignment restrictive forces of the dielectric layers 5 and 6 formed under the aligning films 7 and 8 do not deteriorate the responding characteristics of the liquid crystal molecules in the liquid crystal layer 10 in response to the application of an electric field. Since the bistability of the aligning states of the liquid crystal molecules is good, the memory characteristic of the liquid crystal 10 is improved.

This memory characteristic depends upon the dielectric layers 5 and 6 and the polar power components of the surface energies of the aligning films 7 and 8. More specifically, if the polar power components of the surface energies of the aligning films 7 and 8 directly contacted the liquid crystal layer 10 are relatively strong, the powers acting between the liquid crystal molecules and the aligning films 7, 8 become relatively strong. Accordingly, its initial alignment is stabilized. However, since the power acting, in cooperation with the electric field, to the liquid crystal molecules when the electric field is applied is weak, the operation of the crystal molecules by the electric field is disturbed, and it does not function as a liquid crystal optical device. However, when the surface energies of the aligning films 7 and 8 directly contacted the liquid crystal are made relatively small and the dielectric layers 5 and 6 having relatively large polar power components of the surface energies are provided under the aligning films 7 and 8, the alignment restrictive force acting to the liquid crystal molecules can be optimized to bring good alignment and good operating characteristic in the liquid crystal molecules, thereby improving the memory characteristics of the liquid crystal layer 10.

This memory characteristic is evaluated by the threshold electric field when the liquid crystal optical device is driven. The threshold electric field is represented by the intensity of the electric field when the aligning state is initially varied from one stable state to the other stable state while the intensity of the electric field to be applied to the liquid crystal is being increased, and means that, the higher the threshold electric field is, the better the memory characteristic is.

Then, the threshold electric field characteristic of the above-mentioned liquid crystal optical device will be described by the results examined for the devices of examples 1 to 4 in which dielectric layers 5 and 6 are formed of dielectric materials shown in the following Table 1 and ferroelectric liquid crystals having the characteristics in the following Tables 2 are sealed as liquid crystals.

TABLE 1

| DIELECTRIC LAYER (SURFACE THICKNESS 500 Å) | SURFACE ENERGY [dyn/cm] | | |
| --- | --- | --- | --- |
| | POLAR POWER ELEMENT $\gamma p$ | DISPERSED ELEMENT $\gamma d$ | $\gamma p + \gamma d$ |
| EXAMPLE 1 | | | |
| ZIRCONIUM OXIDE SERIES A | 21.9 | 25.6 | 47.5 |
| EXAMPLE 2 | | | |
| TiO$_2$ | 26.1 | 24.8 | 50.9 |
| EXAMPLE 3 | | | |
| ZIRCONIUM OXIDE SERIES B | 31.2 | 25.2 | 56.4 |
| EXAMPLE 4 | | | |
| TiO$_2$ + SiO$_2$ | 38.5 | 22.6 | 61.1 |

TABLE 2

| TRANSITION POINT TEMPERATURE (°C.) | Cryst - S$_M$C* | — |
| --- | --- | --- |
| | S$_M$C*—S$_M$A | 77.7 |
| | S$_M$A—N* | 93.9 |
| | N*—Iso | 102.6 |
| SPONTANEOUS POLARIZATION (25° C.) [nc/cm$^2$] | | 45 |
| TILT ANGLE (25° C.) [deg] | | 29 |

Figure 2:
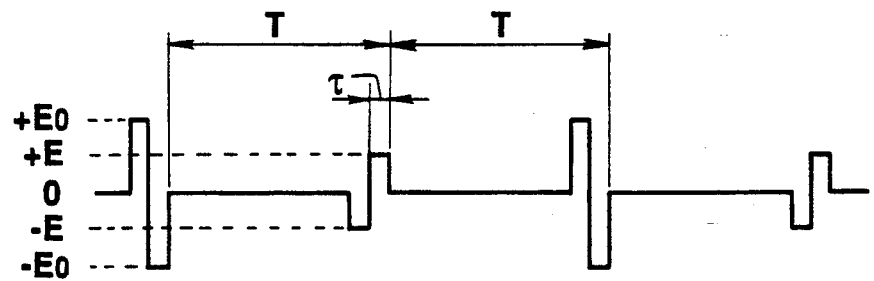
FIG. 2 is an electric field waveform diagram showing a waveform of an electric field to be applied between electrodes opposed to each other to drive a liquid crystal optical device shown in FIG. 1.

The threshold electric fields of the devices of the above-mentioned examples 1 to 4 were measured by applying a dipole pulse electric field for a test shown in FIG. 2 to the devices. In FIG. 2, reference character E$_0$ denotes a reset pulse electric field, reference character E denotes a set pulse electric field, and reference character T denotes an applying cycle of the reset pulse electric field E$_0$ and the set pulse electric field E. Reference character $\tau$ denotes a pulse width.

Figure 3:
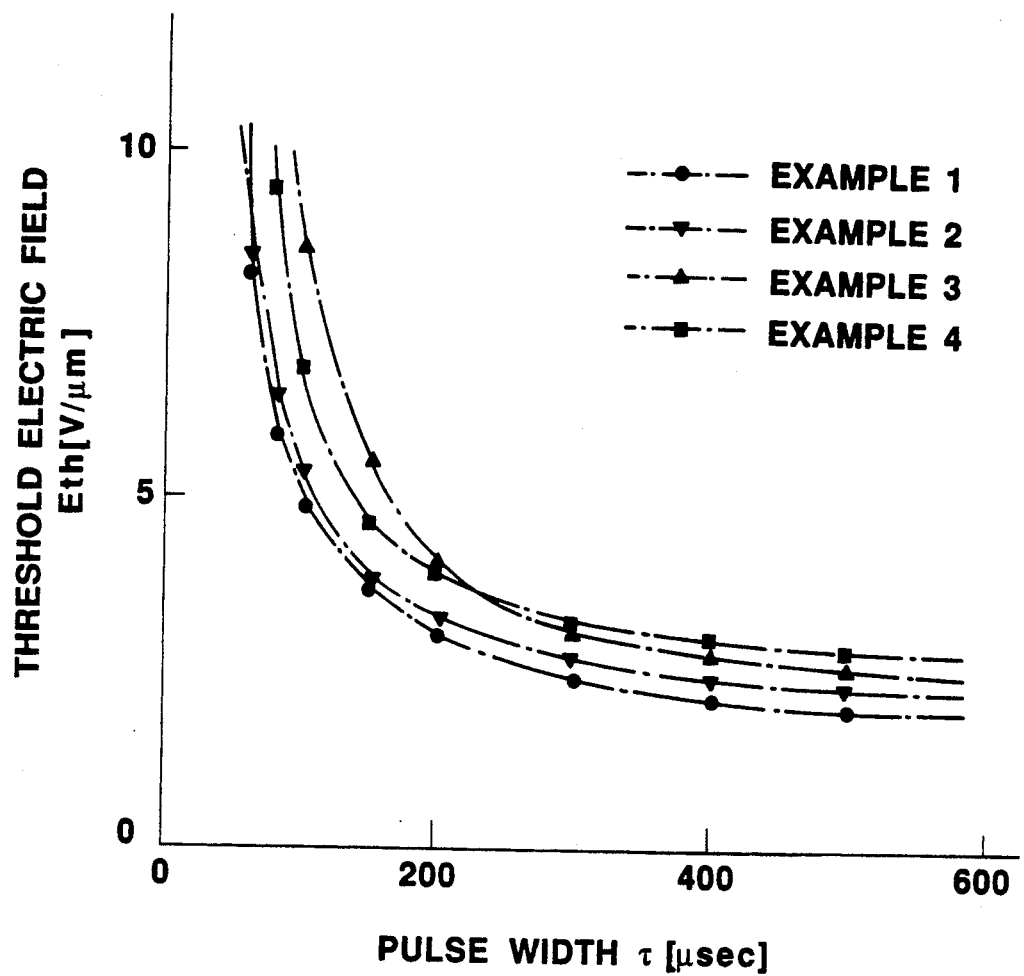
FIG. 3 is a graph showing relationship between a threshold electric field and a pulse width of the applied electric field.

FIG. 3 shows the measured result of threshold electric fields Eth [V/$\mu$m] of the devices of the examples 1 to 4 with respect to the pulse width $\tau$ [$\mu$sec] of an applied pulse by applying the dipole pulse electric field for the test in FIG. 2 to the devices of the examples 1 to 4. Here, an electric field necessary to vary by 50% the permeability of the light in a memory state reset by the reset pulse electric field E$_0$ [V/$\mu$m] is defined as a threshold electric field Eth [V/$\mu$m]. As shown in FIG. 3, the all devices of the examples 1 to 4 have high threshold value with respect to the pulse electric field, and sufficient bistability.

The threshold electric field characteristic satisfies the relationship represented by the following equation:

$$Eth = Eth^\infty + b/\tau$$

where $Eth^\infty$, b are constants.

Figure 4:
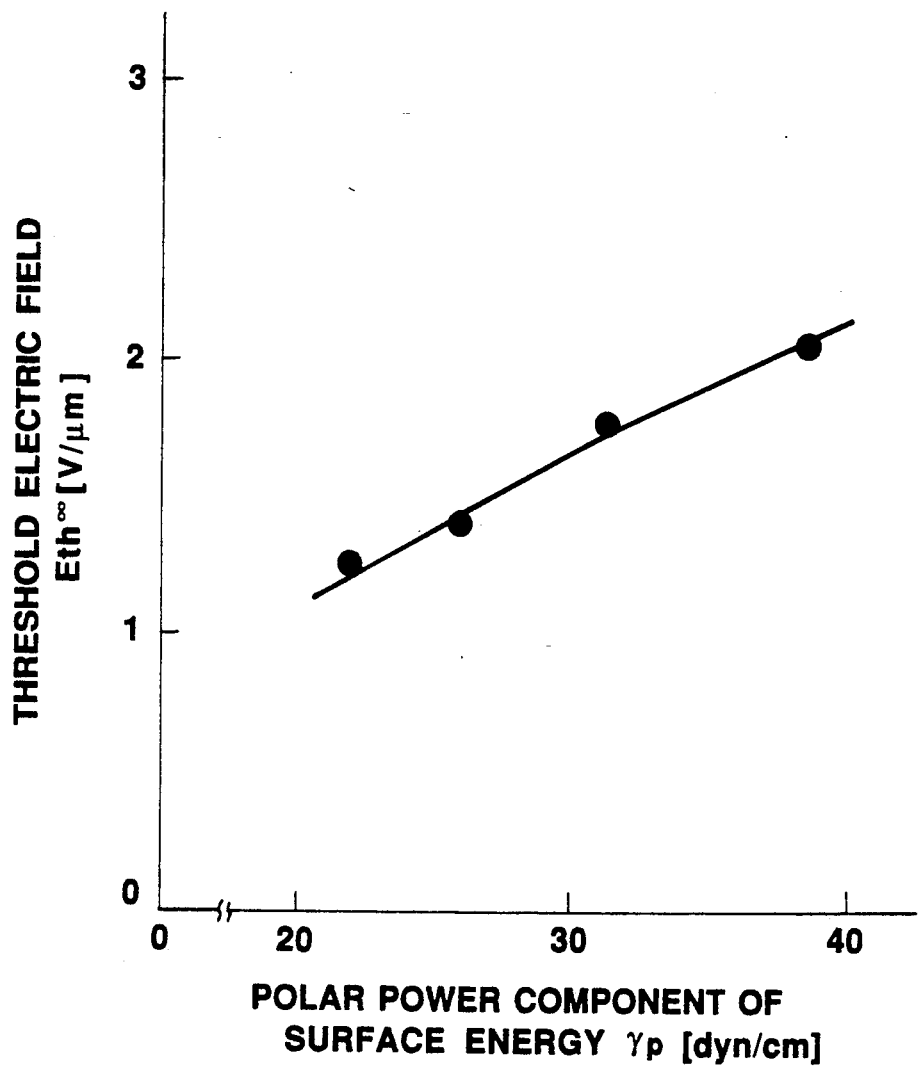
FIG. 4 is a graph showing relationship between a threshold electric field and a polar power component of surface energy of an aligning film.

FIG. 4 is a view showing threshold electric field $Eth^\infty$ [V/$\mu$m] of the liquid crystal elements of the above examples, obtained with respect to the applied pulse ($\tau \to \infty$) having sufficiently large pulse width $\tau$ [$\mu$sec], and plotted with respect to the polar power components $\gamma p$ [dyn/cm] of the surface energies of the dielectric layers 5 and 6. As shown in FIG. 4, the larger the polar power components $\gamma p$ [dyn/cm] of the surface energies of the dielectric layers 5 and 6 are increased, the higher the threshold electric field $Eth^\infty$ [v/$\mu$m] becomes. The fact that the threshold electric field $Eth^\infty$ is high means that the bistability of the liquid crystal 10 is high and its memory characteristic is strong. Accordingly, if the polar power components of the sur-face energies of the dielectric layers 5 and 6 are approx. 20 dyn/cm or more, sufficient memory characteristic are incorporated. The higher the polar power com-ponents of the surface energies of the dielectric layers 5 and 6 are, it is better, and if it is 25 dyn/cm or more, or 30 dyn/cm or more, it is more effective.

According to the examples described above, sufficient memory characteristics can be obtained by raising the threshold electric field without reducing the operating characteristic of the liquid crystal 10 with respect to the electric field.

Since two layers of the dielectric layers 5, 6 and the aligning layers 7, 8 are interposed between the transparent electrodes 3, 4 and the liquid crystal layer 10 on the substrates 1, 2 in the liquid crystal optical device of the above-described embodiment, even if a conductive foreign material is mixed with the liquid crystal layer 10, it can reliably prevent a short-circuit between the electrodes 3 and 4 of the both substrates 1 and 2.

In the embodiment described above, the dielectric layers 5 and 6 are formed under the aligning films 5 and 6 of a pair of the substrates 1 and 2. However, the dielectric layers 5, 6 may be formed only under the aligning film of either one substrate 1 or 2 of the pair of substrates 1, 2. The same effects as those of the above-mentioned embodiment can be obtained even with this case.

The aligning films 7, 8 are desirably formed to be obliquely deposited layers of a silicon oxide (SiO) as in the embodiment. However, the aligning films 7, 8 may be formed of obliquely deposited layers of an inorganic substance except the silicon oxide or an organic substance film rubbed to provide a uniaxial alignment.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A liquid crystal optical device comprising:
   a first substrate having a first substrate surface on which a first electrode is formed;

a second substrate having a second substrate surface on which a second electrode is formed;

a first aligning film covering one of the first and second electrodes and at least a portion of the substrate surface on which the one of the first and second electrodes is formed;

a second aligning film covering the other of said first and second electrodes and at least a portion of the substrate surface on which the other of the first and second electrodes is formed;

a dielectric layer disposed between at least one of the first and second aligning films and the electrode covered by the at least one aligning film;

the dielectric layer having a surface energy including a polar power component and a dispersed component, the value of the polar power component being at least 20 dyn/cm of the surface energy, wherein the surface energy of said dielectric layer is larger than the surface energy of said at least one aligning film;

a sealing member for bonding the first and second substrates to each other with a predetermined gap therebetween so that the first and second substrate surfaces on which the first and second electrodes are respectively formed face each other across the predetermined gap, said sealing member further sealing the gap; and a ferroelectric liquid crystal material sealed in the gap formed between the first and second substrates and sealed by the sealing member;

whereby the polar power component of at least 20 dyn/cm substantially uniformly aligns a plurality of molecules in the liquid crystal material and provides a first and a second stable switching state for the liquid crystal material.

2. A liquid crystal optical device according to claim 1, wherein said dielectric layer is composed of a metal oxide film.

3. A liquid crystal optical device according to claim 2, wherein said dielectric layer is composed of at least one of metal oxide films of zirconium oxide series, titanium oxide series, and silicon oxide series.

4. A liquid crystal optical device according to claim 1, wherein said dielectric layer is composed of a mixture of at least two types of metal oxide films of zirconium oxide series, titanium oxide series, and silicon oxide series.

5. A liquid crystal optical device according to claim 1, wherein said first and second aligning films are dielectric films formed by obliquely depositing an inorganic substance.

6. A liquid crystal optical device according to claim 5, wherein said inorganic substance is silicon oxide.

7. A liquid crystal optical device according to claim 5, wherein each of said first and second aligning films has a thickness of approx. 500 to approx. 2000 Å.

8. A liquid crystal optical device according to claim 7, wherein each of said first and second aligning films has a thickness of approx. 1000 Å.

9. A liquid crystal optical device according to claim 1, wherein said liquid crystal material is composed of a liquid crystal composition exhibiting Chiral Smectic C* phase.

10. A liquid crystal optical device according to claim 1, wherein the surface energy of the dielectric layer has a value of at least 47.5 dyn/cm.

* * * * *